(12) United States Patent
Takahashi et al.

(10) Patent No.: US 11,827,996 B2
(45) Date of Patent: Nov. 28, 2023

(54) NI DIFFUSION-PLATED STEEL SHEET AND METHOD FOR MANUFACTURING NI DIFFUSION-PLATED STEEL SHEET

(71) Applicant: NIPPON STEEL CORPORATION, Tokyo (JP)

(72) Inventors: Takehiro Takahashi, Tokyo (JP); Kiyokazu Ishizuka, Tokyo (JP); Yasuto Goto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 107 days.

(21) Appl. No.: 17/044,678

(22) PCT Filed: Apr. 12, 2019

(86) PCT No.: PCT/JP2019/015986
§ 371 (c)(1),
(2) Date: Oct. 1, 2020

(87) PCT Pub. No.: WO2019/198820
PCT Pub. Date: Oct. 17, 2019

(65) Prior Publication Data
US 2021/0147996 A1    May 20, 2021

(30) Foreign Application Priority Data
Apr. 13, 2018   (JP) .................... 2018-077882

(51) Int. Cl.
*C25D 5/50*   (2006.01)
*C21D 9/46*   (2006.01)
(Continued)

(52) U.S. Cl.
CPC .............. *C25D 5/50* (2013.01); *B32B 15/015* (2013.01); *C21D 9/46* (2013.01); *C22C 38/001* (2013.01);
(Continued)

(58) Field of Classification Search
None
See application file for complete search history.

(56) References Cited

U.S. PATENT DOCUMENTS

2012/0171518 A1* 7/2012 Takematsu ............... C25D 7/00
148/530
2016/0168657 A1* 6/2016 Horie ...................... C23C 10/28
148/518
(Continued)

FOREIGN PATENT DOCUMENTS

AU       670287 B2     7/1996
JP       6-2104 A      1/1994
(Continued)

OTHER PUBLICATIONS

Machine translation of JP 2017-190469 A translated via EPO on Sep. 27, 2022 (Year: 2017).*

(Continued)

*Primary Examiner* — Elizabeth Collister
(74) *Attorney, Agent, or Firm* — Birch, Stewart, Kolasch & Birch, LLP

(57) ABSTRACT

A Ni diffusion-plated steel sheet of the present invention includes a base steel sheet and a Fe—Ni diffusion alloy-plating layer positioned on at least one surface of the base steel sheet, a Ni coating weight of the Fe—Ni diffusion alloy-plating layer is 9.0 to 35 g/m², a Fe concentration Cs of an outermost layer of the Fe—Ni diffusion alloy-plating layer is 10 to 55 mass %, the base steel sheet has a predetermined chemical composition, and a ferrite grain size number specified by JIS G 0551 (2013) of the base steel sheet is 10.0 or more.

8 Claims, 3 Drawing Sheets

(51) Int. Cl.
- *B32B 15/01* (2006.01)
- *C22C 38/00* (2006.01)
- *C22C 38/02* (2006.01)
- *C22C 38/04* (2006.01)
- *C22C 38/06* (2006.01)
- *C22C 38/08* (2006.01)
- *C22C 38/12* (2006.01)
- *C22C 38/14* (2006.01)
- *C25D 3/12* (2006.01)
- *C25D 7/00* (2006.01)
- *H01M 50/145* (2021.01)

(52) U.S. Cl.
CPC ............ *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C25D 3/12* (2013.01); *C25D 7/00* (2013.01); *H01M 50/145* (2021.01)

(56) References Cited

U.S. PATENT DOCUMENTS

| | | |
|---|---|---|
| 2017/0170436 A1 | 6/2017 | Ibaragi et al. |
| 2020/0048730 A1* | 2/2020 | Oka .................... C22C 38/04 |

FOREIGN PATENT DOCUMENTS

| | | | |
|---|---|---|---|
| JP | H09-306438 A | 11/1997 | |
| JP | 2014-47359 A | 3/2014 | |
| JP | 2017190469 A * | 10/2017 | |
| KR | 10-2013-0140496 A | 12/2013 | |
| WO | WO 2016/013575 A1 | 1/2016 | |
| WO | WO-2018194135 A1 * | 10/2018 | ............... B32B 1/08 |

OTHER PUBLICATIONS

"Methods of salt spray testing", JIS Z 2371, 2000, total 7 pages.
"Steels-Micrographic determination of the apparent grain size", JIS G 0551, 2013, total 6 pages.
Nitto et al., "Development of high efficiency electrolytic cell (LCC)", Newsletter of The Japan Institute of Metals and Materials, 1984, vol. 23, No. 6, pp. 541-543.
Sakai et al., "A study on shortening of gap between horizontal fluid-supported electrolytic cells", The journal of the Iron and Steel Institute of Japan, Tetsu to hagane, Sep. 5, 1985, vol. 71, No. 13, S1276.
U.S. Office Action for U.S. Appl. No. 17/046,674, dated Apr. 10, 2023.

* cited by examiner

NI DIFFUSION-PLATED STEEL SHEET AND METHOD FOR MANUFACTURING NI DIFFUSION-PLATED STEEL SHEET

TECHNICAL FIELD OF THE INVENTION

The present invention relates to a Ni diffusion-plated steel sheet and a method for manufacturing a Ni diffusion-plated steel sheet.

Priority is claimed on Japanese Patent Application No. 2018-077882, filed Apr. 13, 2018, the content of which is incorporated herein by reference.

RELATED ART

Ni has excellent chemical stability, and thus Ni-plated steel sheets are used as materials for containers of a variety of batteries (battery cans) such as an alkaline manganese dry battery, a lithium ion battery, or a nickel-hydrogen battery. As a method for Ni plating for a battery can, there is a method in which a can is manufactured and then barrel plating is performed and a method in which a steel strip is plated before a can is manufactured, and the method in which a steel strip is plated before a can is manufactured is advantageous from the viewpoint of the manufacturing cost or plating uniformity. However, for a Ni-plated steel sheet that is plated with Ni before a can is manufactured, there is a case where a crack is generated in a Ni-plating layer due to working during the manufacturing of the can. A Ni plating is a barrier-type antirust film and, unlike a Zn-plated film, does not have sacrificial corrosion resistance properties, and thus, when a pinhole or a crack is present in the Ni-plating layer, there is a case where the corrosion resistance degrades.

Regarding the above-described problem of the degradation of the corrosion resistance caused by working, for example, Patent Document 1 describes a highly corrosion-resistant Ni-plated steel strip in which Ni is plated on a cold-rolled steel sheet to a thickness of 1 to 5 μm and then a part or all of a Ni-plating layer is converted to a Fe—Ni diffusion layer. When the steel strip obtained after the Ni plating is heat-treated, the Fe—Ni diffusion alloy layer is formed in an interface between the Ni plating and the steel sheet, and the adhesion of the plating layer improves (hereinafter, a steel sheet having a Fe—Ni diffusion alloy layer formed in at least an interface between a Ni plating and the steel sheet by the heat treatment of a Ni-plated steel sheet will be referred to as "Ni diffusion-plated steel sheet"). In this case, in a case where the Fe—Ni alloy layer is not sufficiently formed up to a surface of the Ni-plating layer and a non-alloyed Ni phase remains in a surface layer of the Ni-plating layer, the Ni phase recrystallizes due to thermal history. The Ni-plating layer is soft and is thus not easily cracked while being worked and is capable of suppressing the base steel sheet being exposed after being worked. However, the recrystallized soft Ni-plating layer is likely to be seized to a die during pressing, which creates a problem of the degradation of productivity.

In order to suppress the Ni-plating layer being seized to a die, it is necessary to diffuse Fe up to the surface layer. Patent Document 2 below discloses a surface-treated steel sheet for a battery container for forming a battery container of a battery in which a non-aqueous electrolytic solution is used as an electrolytic solution, the steel sheet having a Fe—Ni diffusion layer formed by forming a Ni-plating layer on at least a surface of the steel sheet, which will be on an inner surface side of the battery container, and then carrying out a thermal diffusion treatment thereon, in which a ratio of Ni to Fe in an outermost layer of the Fe—Ni diffusion layer is 7.5 or less in terms of a molar ratio of Ni/Fe, and a thickness of the Fe—Ni diffusion layer is 0.6 μm or more.

Patent Document 2 describes that, as conditions for the thermal diffusion treatment, in the case of continuous annealing, it is preferable to set a heat treatment temperature to 700° C. to 800° C. and set a heat treatment time to 10 to 300 seconds, and, under such heat treatment conditions, the surface layer of the plating layer can be alloyed so as to have a predetermined Fe concentration by the heat treatment of a 1 μm-thick Ni-plating layer.

PRIOR ART DOCUMENT

Patent Document

[Patent Document 1] Japanese Unexamined Patent Application, First Publication No. H6-2104
[Patent Document 2] Japanese Unexamined Patent Application, First Publication No. 2014-47359

DISCLOSURE OF THE INVENTION

Problems to be Solved by the Invention

Here, in Patent Document 2, even when the thickness of the Ni-plating layer exceeds 1 μm, it is possible to diffuse Fe up to the outermost layer of the plating layer and produce a Fe—Ni alloy layer by increasing the heat treatment temperature or limitlessly extending the heat treatment time. However, when the heat treatment temperature is increased or the heat treatment time is limitlessly extended, it becomes impossible for a base steel sheet to ensure mechanical properties or formability, which the base steel sheet is supposed to originally have, due to coarsening or the like of crystal grains in the base steel sheet. In the present specification, unless particularly otherwise described, the composition of an outermost layer of a plating layer refers to the composition of the surface measured by Auger electron spectroscopy (AES) after removing a contaminated layer or an oxide layer which may be present on the surface of the plating layer by argon ion etching.

Generally, it is known that the press formability of a steel sheet can become a more favorable characteristic as a mean plastic strain ratio $r_m$ increases, and it is considered that a high mean plastic strain ratio $r_m$ can be ensured by using interstitial free (IF) steel such as extra-low carbon Ti-added steel, extra-low carbon Nb-added steel, or extra-low carbon Ti—Nb-added steel. However, generally, crystal grains in IF steel tend to coarsen more than those in low-carbon steel such as Al-killed steel. Therefore, in the case of seeking to obtain a Ni diffusion-plated steel sheet in which the thickness of a Ni-plating layer exceeds 1 μm and Fe—Ni are alloyed up to the outermost layer of the plating layer using IF steel or a base steel equivalent to IF steel, the temperature during annealing becomes high, and thus there is a concern that the crystal grains may further coarsen.

The mean plastic strain ratio refers to a value defined by Expression (1).

$$r_m = (r_0 + 2 \times r_{45} + r_{90})/4 \tag{I}$$

In Expression (1), $r_0$ is a rolling-direction r value, $r_{90}$ is an r value in a direction orthogonal to the rolling direction, $r_{45}$ is a 45°-direction r value, and the r value is a plastic strain ratio (Lankford value).

Here, in a case where the Ni plating thickness is set to 1 μm or less as disclosed in Patent Document 2 in order to diffuse Fe to the outermost layer of the Ni-plating layer, the corrosion resistance becomes insufficient. On the other hand, in a case where the Ni plating thickness is set to more than 1 μm, it is necessary to select a condition in which a treatment condition for the thermal diffusion treatment becomes a high temperature side or a long time side, which results in the coarsening of base steel crystal grains as described above. The coarsening of the base steel crystal grains leads to a problem of the degradation of the surface roughening resistance particularly for a material for a can.

In addition, the thermal diffusion treatment does not have to be a high-temperature and short-time treatment as carried out in a continuous annealing line, and it can also be considered to select conditions of a low temperature and a long time as carried out in BAF annealing. However, in the case of using BAF annealing, when the plating thickness of the Ni-plating layer becomes more than 1 μm, similar to the case of continuous annealing, it is difficult to diffuse Fe up to the outermost layer of the plating layer without causing the coarsening of base steel crystal grains.

Therefore, the present invention has been made in consideration of the above-described problem, and an object of the present invention is to provide a Ni diffusion-plated steel sheet having superior corrosion resistance and a superior die sliding ability while maintaining the characteristics of an IF-based base steel and a method for manufacturing a Ni diffusion-plated steel sheet.

Means for Solving the Problem

As a result of intensive studies regarding the above-described problem, the present inventors found that, when a plating bath composition satisfies a specific condition, Fe easily diffuses into a Ni-plating layer and completed the present invention by applying such knowledge to a specific IF steel-based base steel sheet.

That is, the present inventors found that, when a Ni electroplating bath containing a chloride ion concentration of 35.0 g/L or more is employed at the time of carrying out Ni electroplating on a steel sheet, the Fe—Ni alloying in a thermal diffusion treatment is significantly accelerated compared with a case in which a Watts bath or the like is used. The present inventors succeeded in obtaining a desired Ni diffusion-plated steel sheet by using a specific IF-based steel sheet as a base steel and carrying out Ni electroplating on the basis of such knowledge.

The gist of the present invention completed on the basis of such knowledge is as follows.

(1) A Ni diffusion-plated steel sheet according to an aspect of the present invention includes a base steel sheet; and a Fe—Ni diffusion alloy-plating layer positioned on at least a single surface of the base steel sheet, in which a Ni coating weight of the Fe—Ni diffusion alloy-plating layer is 9.0 to 35 g/m², a Fe concentration Cs of an outermost layer of the Fe—Ni diffusion alloy-plating layer is 10 to 55 mass %, a chemical composition of the base steel sheet includes, by mass %, C: 0.0010% to 0.0200%, Si: 0.1% or less, Mn: 0.05% to 0.90%, P: 0.025% or less, S: 0.025% or less, sol. Al: 0.003% to 0.100%, N: 0.0070% or less, and B: 0% to 0.0050%, further contains at least one of Ti: 0.100% or less or Nb: 0.120% or less such that a relationship represented by Expression (1) is satisfied, a remainder consisting of Fe and impurities, and a ferrite grain size number specified by JIS G 0551 (2013) of the base steel sheet is 10.0 or more.

$$(C/12+N/14)<(Ti/48+Nb/93)+0.0010 \qquad \text{Expression (1)}$$

In Expression (1), C, N, Ti, and Nb are contents (unit: mass %) of each element, to which 0 is assigned in a case where each element is not included.

(2) In the Ni diffusion-plated steel sheet according to (1), the Fe concentration Cs of the outermost layer of the Fe—Ni diffusion alloy-plating layer may be 15 to 40 mass %.

(3) In the Ni diffusion-plated steel sheet according to (1), the Ni coating weight of the Fe—Ni diffusion alloy-plating layer may be 15 to 30 g/m².

(4) The Ni diffusion-plated steel sheet according to (1) may be used as a material for a container, and the Fe—Ni diffusion alloy-plating layer may be provided on a side of the base steel sheet, the side to become an outer surface of a container by press forming.

(5) A method for manufacturing a Ni diffusion-plated steel sheet according to another aspect of the present invention has a Ni plating process of forming a Ni-plating layer having an coating weight of 9.0 to 35 g/m² on at least one surface of a base steel sheet having the chemical composition according to (1) by electroplating using a Ni plating bath which has a chloride ion concentration of 35.0 g/L or more and a Ni ion concentration of 40.0 g/L or more; and an annealing and alloying treatment process of, after the Ni plating process, carrying out a heat treatment in a temperature range of 740° C. to 850° C. for a soaking period of 5 to 180 seconds to set a Fe concentration Cs of an outermost layer of the Ni-plating layer to 10 to 55 mass %.

(6) In the Ni diffusion-plated steel sheet according to (2), the Ni coating weight of the Fe—Ni diffusion alloy-plating layer may be 15 to 30 g/m².

(7) The Ni diffusion-plated steel sheet according to (2) may be used as a material for a container, and the Fe—Ni diffusion alloy-plating layer may be provided on a side of the base steel sheet, the side to become an outer surface of a container by press forming.

(8) The Ni diffusion-plated steel sheet according to (3) may be used as a material for a container, and the Fe—Ni diffusion alloy-plating layer may be provided on a side of the base steel sheet, the side to become an outer surface of a container by press forming.

Effects of the Invention

According to the present invention as described above, it becomes possible to obtain a Ni diffusion-plated steel sheet having superior corrosion resistance and a superior die slidability while maintaining the characteristics of an IF steel-based base steel and a method for manufacturing a Ni diffusion-plated steel sheet.

EMBODIMENTS OF THE INVENTION

Hereinafter, a preferred embodiment of the present invention will be described in detail with reference to the accompanying drawings. In the present specification and the drawings, configurational elements having substantially the same function and configuration will be given the same reference symbol and will not be described again.

(Overall Configuration of Ni Diffusion-Plated Steel Sheet)

Figure 1A:
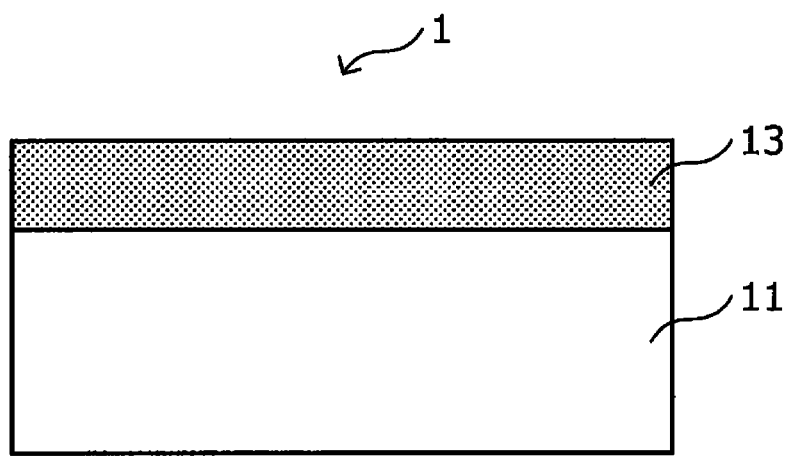
FIG. 1A is an explanatory view schematically showing an example of a structure of a Ni diffusion-plated steel sheet according to an embodiment of the present invention.
Figure 1B:
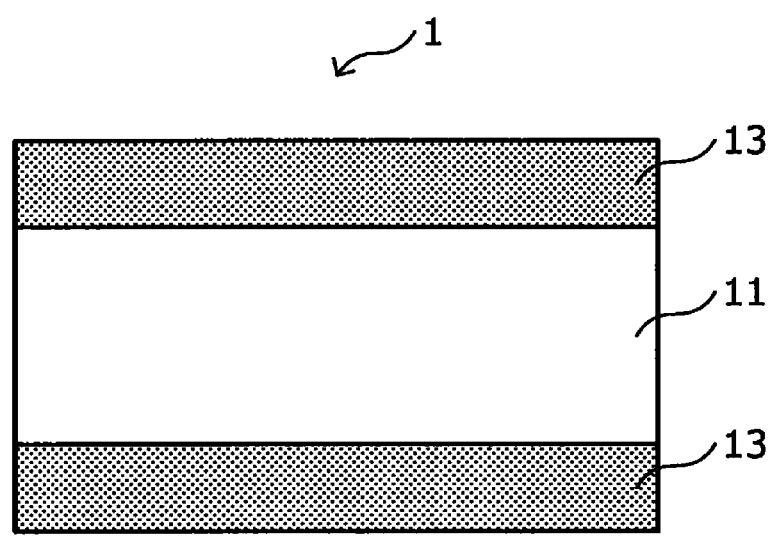
FIG. 1B is an explanatory view schematically showing an example of the structure of the Ni diffusion-plated steel sheet according to another embodiment of the present invention.

First, the overall configuration of a Ni diffusion-plated steel sheet according to the embodiment of the present invention will be described with reference to FIG. 1A and FIG. 1B. FIG. 1A and FIG. 1B are explanatory views schematically showing an example of the structure of the Ni diffusion-plated steel sheet according to the present embodiment.

As schematically shown in FIG. 1A, a Ni diffusion-plated steel sheet 1 according to the present embodiment includes at least a base steel sheet 11 and a Fe—Ni diffusion alloy-plating layer 13 positioned on the base steel sheet 11. Here, the Fe—Ni diffusion alloy-plating layer 13 according to the present embodiment may be provided on one surface of the base steel sheet 11 as schematically shown in FIG. 1A or may be provided on both surfaces of the base steel sheet 11 as schematically shown in FIG. 1B.

The Fe—Ni diffusion alloy-plating layer 13 is a plating layer formed by carrying out an alloying treatment on a Ni-plated steel sheet, and the concentration gradients of Fe and Ni are formed in the Fe—Ni diffusion alloy-plating layer 13.

Figure 2:
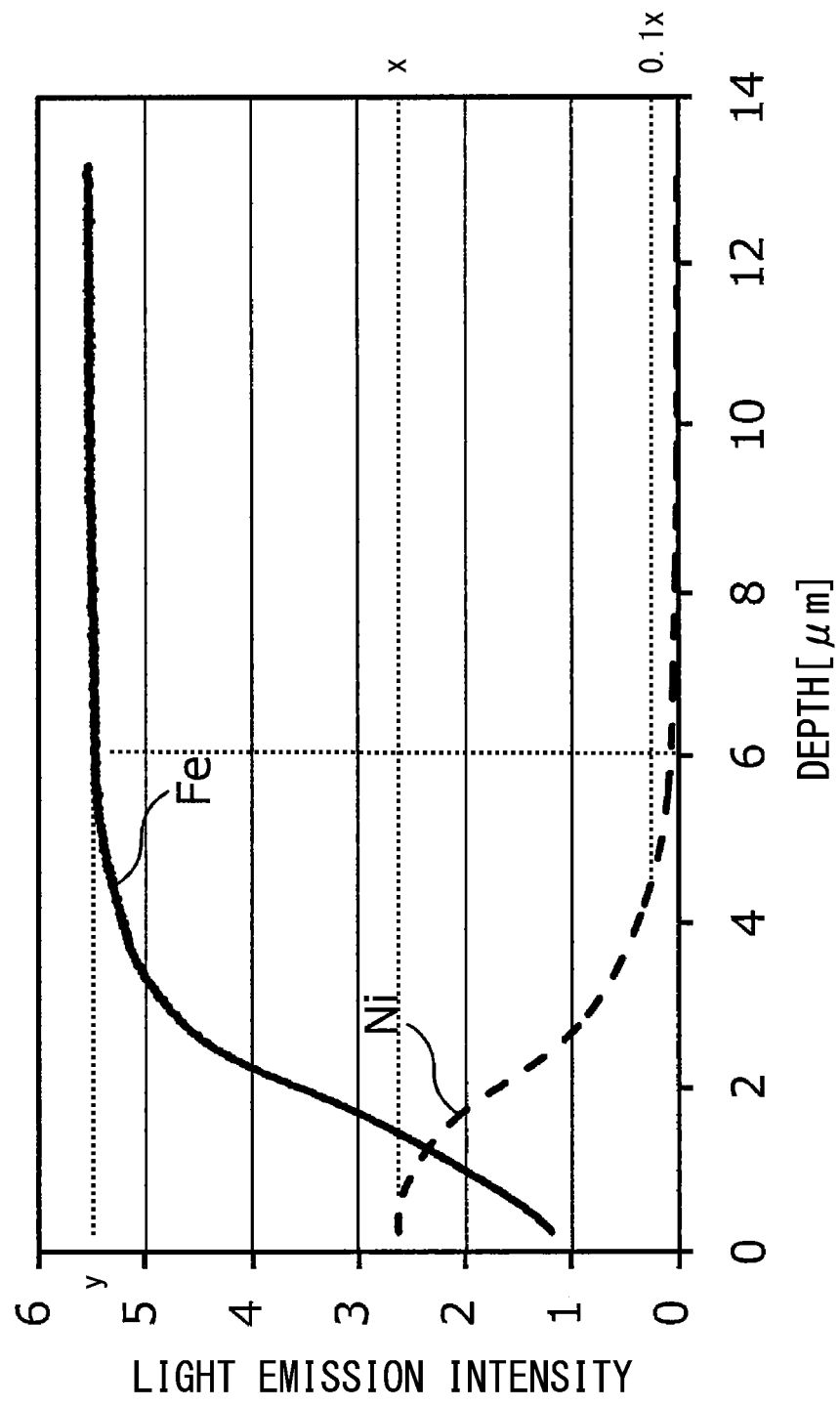
FIG. 2 is a view showing an analysis example of Ni and Fe in a depth direction of a Fe—Ni diffusion alloy-plating layer by glow-discharge optical emission spectroscopy (GDS) of the Ni diffusion-plated steel sheet according to an embodiment of the present invention.

FIG. 2 is a view showing an analysis example of Ni and Fe in a plating layer depth direction of the Ni diffusion-plated steel sheet according to the present embodiment by glow-discharge optical emission spectroscopy (GDS). As shown in FIG. 2, in the Fe—Ni diffusion alloy-plating layer 13, Ni shows a concentration profile which shows a maximum concentration in an outermost layer of the Fe—Ni diffusion alloy-plating layer 13 and monotonously decreases in a depth direction of the Fe—Ni diffusion alloy-plating layer 13.

At this time, when a Ni intensity at a position 0.5 μm away from the outermost surface of the Fe—Ni diffusion alloy-plating layer in the depth direction of the Fe—Ni diffusion alloy-plating layer 13 is represented by x, an average value of a Ni change rate while the Ni intensity changes down to 0.1x (that is, an intensity of 10% of the maximum intensity of Ni) becomes a gradient of −0.10x/μm or less (0.10x/μm or more as an absolute value). In an Example shown in FIG. 2, the average value of the Ni change rate while the Ni intensity changes from x to 0.1x is approximately −0.20x/μm.

In addition, Fe shows a concentration profile which shows a minimum concentration on a surface of the Fe—Ni diffusion alloy-plating layer 13 and monotonously increases in the depth direction of the Fe—Ni diffusion alloy-plating layer 13.

At this time, when a Fe intensity at a position 6 μm away from the surface of the Fe—Ni diffusion alloy-plating layer 13 is represented by y, an average value of change rates of the Fe intensity in a range from the surface of the Fe—Ni diffusion alloy-plating layer 13 to 1 μm and a range from the surface to 2 μm is 0.02y/μm or more. In the Example shown in FIG. 2, the average value of the change rates of the Fe intensity in the range from the surface of the Fe—Ni diffusion alloy-plating layer 13 to 1 μm and the range from the surface to 2 μm is approximately 0.14y/μm.

Here, in the computation of the above-described change rates, in a case where the concentration (intensity) increases in the depth direction (the rightward direction in FIG. 2), a positive value is used.

The concentration gradients of Fe and Ni shown in FIG. 2 are the measurement results by GDS of the distribution statuses of Fe and Ni in the depth direction for a Fe—Ni diffusion alloy-plating layer 13 in a test number 3 of an example described below. In such measurements, GDA750 manufactured by Rigaku Corporation was used as a GDS device, and the measurements were carried out under conditions of a direct current mode, a voltage of 900 V, a current of 20 mA, an Ar pressure of 3 hPa, and a measurement time of 200 seconds. A depth sputtered for 200 seconds was measured using a micrometer, and a sputtering depth per time was computed. At this time, a sputtering rate was calculated under a presumption that the sputtering rate remained unchanged for 200 seconds from the start.

In FIG. 2, discharge is unstable near the outermost surface, and thus data are not shown. The results of FIG. 2 show the intensities measured for the respective elements of Fe and Ni, and do not directly show the compositions (mass %), but show tendencies of the concentration gradients of the respective elements caused by the mutual diffusion of Fe and Ni.

The Ni diffusion-plated steel sheet 1 according to the present embodiment can be used as a material for containers of a variety of batteries (battery containers) such as an alkaline manganese dry battery, a lithium ion battery, and a nickel-hydrogen battery and is worked to a shape of a desired battery container by a variety of press forming. Here, in a case where the Fe—Ni diffusion alloy-plating layer 13 is provided on one surface of the base steel sheet 11 as shown in FIG. 1A, the Fe—Ni diffusion alloy-plating layer 13 is preferably provided on a side of the base steel sheet 11 which will become an outer surface of the battery container by press forming.

(Regarding Base Steel Sheet 11)

Next, the base steel sheet 11 in the Ni diffusion-plated steel sheet 1 according to the present embodiment will be described in detail.

<Regarding Chemical Composition of Base Steel Sheet 11>

Hereinafter, the chemical composition of the base steel sheet 11 according to the present embodiment will be described in detail.

In the following description of the chemical composition, the expression "%" indicates "mass %" unless particularly otherwise described.

The base steel sheet 11 in the Ni diffusion-plated steel sheet 1 according to the present embodiment is an IF steel-based base steel sheet and includes, by mass %, C: 0.0010% to 0.0200%, Si: 0.1% or less, Mn: 0.05% to 0.90%, P: 0.025% or less, S: 0.025% or less, sol. Al: 0.003% to 0.100%, N: 0.0070% or less, and B: 0% to 0.0050%, further contains at least one of Ti: 0.100% or less or Nb: 0.120% such that a relationship represented by Expression (101) is satisfied, a remainder consisting of Fe and impurities.

$$(C/12+N/14)<(Ti/48+Nb/93)+0.0010 \quad \text{Expression (101)}$$

Here, in Expression (101), C, N, Ti, and Nb are the contents (unit: mass %) of the respective elements, and 0 is assigned in a case where each element is not included.

[C: 0.0010% to 0.0200%]

Carbon (C) is an element having an extremely large influence on formability and crystal grain refinement. Generally, as C content decreases, the steel sheet becomes softer, which is advantageous from the viewpoint of formability; however, on the other hand, it becomes difficult for ferrite crystal grains to be refined. On the other hand, as C content increases, it becomes easier for solute C to remain in steel. The sulute C also serves as a cause of stretcher strain. Even in a case where C content is large, it is possible to prevent the adverse influence of the solute C as long as C content is not excessive and C does not form a carbide or a carbonitride together with an element such as Nb or Ti.

In the base steel sheet 11 according to the present embodiment, as described above, the ferrite grain size number specified by "JIS G 0551 (2013): Steels-Micrographic determination of the apparent grain size" is set to 10 or more. In order to realize the above-described ferrite grain size number, in the base steel sheet 11 according to the present embodiment, C content is set to 0.0010% or more. C content is preferably 0.0020% or more. In addition, in the case of intending the additional refinement of ferrite crystal grains, C content is more preferably set to 0.0050% or more.

In the present embodiment, as described above, Ti or Nb is contained in steel, thereby fixing a majority or all of the solute C as at least a carbide or a carbonitride. At this time, when C content exceeds 0.0200%, it becomes difficult to suppress the generation of the solute C. Therefore, in the base steel sheet 11 according to the present embodiment, C content is set to 0.0200% or less. C content is preferably 0.0120% or less and more preferably 0.0100% or less.

[Si: 0.1% or Less]

In the base steel sheet 11 according to the present embodiment, silicon (Si) is contained in steel as an impurity. In a case where Si content exceeds 0.1%, the hardening of steel or the degradation of the surface treatment property is caused. Therefore, in the base steel sheet 11 according to the present embodiment, Si content is set to 0.1% or less. Si content is preferably 0.08% or less, more preferably 0.05% or less, and still more preferably 0.02% or less.

The lower limit value of Si content is not particularly determined, but may be determined to be 0.001% or more from the viewpoint of the desiliconization cost.

[Mn: 0.05% to 0.90%]

Manganese (Mn) is an element that prevents the degradation of hot ductility caused by sulfur (S) that is an impurity included in the base steel sheet 11. Such a hot ductility degradation-suppressing effect can be developed by setting Mn content to 0.05% or more. Therefore, in the base steel sheet 11 according to the present embodiment, Mn content is set to 0.05% or more. Mn content is preferably 0.08% or more. In addition, Mn stabilizes austenite and decreases the Ar3 transformation point and is thus capable of suppressing the recrystallization of austenite crystal grains during hot rolling and refining the austenite crystal grains. Furthermore, Mn is also an element that increases the strength of the steel sheet. When Mn content is set to 0.05% or more, it also becomes possible to develop the above-described effect for refining austenite or the above-described strength improvement effect. When there is an excess content of Mn, the steel sheet becomes hard, and the formability significantly degrades. Such significant degradation of formability becomes significant in a case where Mn content exceeds 0.90%. Therefore, in the base steel sheet 11 according to the present embodiment, Mn content is set to 0.90% or less. Mn content is preferably 0.60% or more and more preferably 0.30% or more.

[P: 0.025% or Less]

Phosphorus (P) is contained in the base steel sheet 11 as an impurity. P is an element that contributes to strength, and thus up to 0.025% may be contained in the base steel sheet 11. However, P is an element that embrittles steel and impairs workability, and thus, in case where it is not intended to ensure strength using P, P content is preferably set to 0.020% or less and more preferably set to 0.012% or less. From the viewpoint of toughness and workability, P content preferably becomes a lower value.

The lower limit value of P content is not particularly determined, but may be determined to be 0.005% or more from the viewpoint of the dephosphorization cost.

[S: 0.025% or Less]

Sulfur (S) is contained in the base steel sheet 11 as an impurity. S is an element that causes the degradation of hot ductility and generates a roughened ear in a hot-rolled steel strip. Such degradation of hot ductility becomes significant in a case where S content exceeds 0.025%. Therefore, in the base steel sheet 11 according to the present embodiment, S content is set to 0.025% or less. S content is preferably 0.015% or less and more preferably 0.008% or less. Particularly, in a case where Ti is mainly used in order to fix the solute N or solute C, there is a case where S bonds to Ti and impairs the effective action of Ti. Therefore, in a case where Ti is mainly used in order to fix the solute N or the solute C, S content is preferably set to 0.0035% or less.

S content is preferably smaller. However, the lower limit value of S is preferably set to approximately 0.0001% from the viewpoint of the desulfurization cost.

[Sol. Al: 0.003% to 0.100%]

Aluminum (Al) is an element necessary for the deoxidation of steel and is also an element that fixes solute N in steel as AlN and suppresses age hardening. In order to obtain these effects, Al content needs to be set to 0.003% or more. Al content is preferably 0.010% or more and more preferably 0.020% or more. On the other hand, when Al content is too large, the frequency of the generation of a surface defect attributed to an alumina cluster or the like rapidly increases. Such a frequency of the generation of a surface defect rapidly increases in a case where Al content exceeds 0.100%, and thus, in the base steel sheet 11 according to the present embodiment, Al content is set to 0.100% or less. Al content is preferably 0.080% or less, more preferably 0.070% or less, and still more preferably 0.055% or less. In the present embodiment, Al means acid-soluble Al (sol. Al).

[N: 0.0070% or Less]

Nitrogen (N) is an element that is inevitably contained in steel. N bonds to Al, Nb, or the like to form a nitride or a carbonitride and impairs hot ductility in some cases. Therefore, N content is preferably smaller. In addition, N is one of solid solution strengthening elements, causes age hardening, leads to the hardening of steel when contained in a large amount, and significantly degrades elongation to deteriorate formability. From the above-described viewpoint, in the base steel sheet 11 according to the present embodiment, N content is set to 0.0070% or less. N content is preferably 0.0060% or less and more preferably 0.0050% or less. Even when N content is decreased to less than 0.0005%, the denitrogenation cost increases, and thus the lower limit value of N content is preferably 0.0005%.

As simply described earlier, in the present embodiment, niobium (Nb) or titanium (Ti) is used to suppress, particularly, the solute C, ensure formability, and suppress the coarsening of ferrite grains by an austenite pinning effect. Therefore, in the base steel sheet 11 according to the present embodiment, 0.120% or less of Nb or 0.100% or less of Ti or combination thereof is contained so as to satisfy a predetermined condition.

[Nb: 0% to 0.120%]

Niobium (Nb) is an effective element for decreasing the soluteC in steel by forming a carbide or a carbonitride and exhibits an effect for improving elongation or the r value. Furthermore, a carbonitride or carbide of Nb refines crystal grains by the austenite pinning effect. In a case where Nb is contained for the purpose of obtaining this effect, Nb content is preferably set to 0.005% or more and more preferably 0.015% or more.

In a case where Nb content exceeds 0.120%, the above-described crystal grain refinement action enters a saturation state, the recrystallization temperature vainly increases, and recrystallization in continuous annealing becomes difficult. Therefore, in the base steel sheet 11 according to the present embodiment, Nb content is set to 0.120% or less.

[Ti: 0% to 0.100%]

Titanium (Ti) is, similar to Nb, an element that fixes the sulute C in steel as a carbide or a carbonitride and suppresses the deterioration of deep drawability caused by the solute C. In addition, Ti is precipitated as TiN at a high temperature, and thus, in a case where B is contained in steel, Ti suppresses the generation of boron nitride (BN) and facilitates the ensuring of free-B (B* described below). In a case where Ti is contained for the purpose of obtaining these effects, Ti content is preferably set to 0.015% or more and more preferably 0.030% or more.

When Ti is excessively contained, there is a case where the recrystallization temperature increases or the degradation of toughness attributed to the coarsening of TiN is caused. Therefore, in the base steel sheet 11 according to the present embodiment, Ti content is set to 0.100% or less.

As described above, Nb and Ti are elements having a similar effect from the viewpoint of fixing the solid solutions of C and N. Therefore, in the present embodiment, Nb or Ti or combination thereof is contained as long as Expression (101) is satisfied. Hereinafter, Expression (101) is reposted.

$$(C/12+N/14)<(Ti/48+Nb/93)+0.0010 \quad \text{Expression (101)}$$

Here, '0.0010' on the right side of Expression (101) means that, even when the solute C or solute N does not need to be completely fixed and an extremely small amount of the solute N or C remains, this does not have a critical influence on formability (particularly, the generation of stretcher strain). The contents of Nb and Ti preferably satisfy a relationship represented by Expression (103).

$$(C/12+N/14)<(Ti/48+Nb/93)+0.0005 \quad \text{Expression (103)}$$

The total content of Nb and Ti preferably reaches 0.015 mass % or more and more preferably reaches 0.020 mass % or more as long as Expression (101) or Expression (103) is satisfied.

[B: 0% to 0.0050%]

Boron (B) is an optional additive element in the present embodiment. B has an effect for improving secondary work brittleness and is also an element having an action of suppressing age hardening attributed to N. Therefore, in the base steel sheet 11 according to the present embodiment, B can be contained as necessary. In order to obtain the above-described effect, B is preferably contained such that B* (free-B) defined by Expression (105) reaches 0.0003 mass % or more.

$$B^*=B-(11/14)\times[N-(14/48)\times Ti] \quad \text{Expression (105)}$$

Here, in Expression (105), B, N, and Ti means the contents (unit: mass %) of the respective elements, and, in a case where $[N-(14/48)\times Ti]$ is a negative value, B* is regarded to be equal to B.

When B content becomes excessive, the steel sheet becomes hard making it difficult to increase the cold rolling reduction, the recrystallization temperature increases, and earring resistance degrades. From the above-described viewpoint, in the base steel sheet 11 according to the present embodiment, B content is set to 0.0050% or less. B content is preferably 0.0030% or less and more preferably 0.0025% or less.

In addition, in the base steel sheet 11 according to the present embodiment, B* is preferably 0.0010 mass % or less.

Among the above-described component ranges of steel, regarding the component ranges of C: 0.0060% to 0.0110%, $500\times[C]\leq[Nb]/[C]\leq8.0$ ([C] and [Nb] respectively mean mass % of C and Nb), and N: less than 0.0025%, the coarsening of crystal grains is easily suppressed even in a temperature range of higher than 800° C. Therefore, in a case where the base steel sheet is included in the above-described component ranges, there is a case where a Ni diffusion-plated steel sheet in which the Ni coating weight of a Fe—Ni alloy-plating layer is in a range of 9.0 to 35 g/m², the Fe concentration Cs of the outermost layer of the Fe—Ni diffusion alloy-plating layer 13 is in a range of 10 to 55 mass %, and crystal grains in a base steel sheet are approximately as fine as or finer than those in the present embodiment can be obtained without using a plating bath containing a high concentration of a chloride ion at the time of carrying out Ni electroplating.

[Remainder]

In the base steel sheet 11 according to the present embodiment, a remainder consisting of Fe and impurities. Here, in the present embodiment, the term impurity means an element mixed into the chemical composition from an ore as a raw material, a scrap, a manufacturing environment, or the like at the time of industrially manufacturing an iron and steel material. As the impurity, for example, Cu, Ni, Cr, Sn, and the like can be exemplified. Preferred contents of these elements are Cu: 0.5% or less, Ni: 0.5% or less, Cr: 0.3% or less, and Sn: 0.05% or less.

In the Ni diffusion-plated steel sheet 1 according to the present embodiment, in the case of assuming a use for a battery can, the base steel sheet 11 is preferably a cold-rolled steel sheet.

<Regarding Crystal Grain Size of Base Steel Sheet 11>

In the base steel sheet 11 according to the present embodiment, a crystal grain size number of ferrite grains (that is, a ferrite grain size number) is 10.0 or more. In a case where the crystal grain size number is less than 10.0, when the base steel sheet is formed in a can shape, a surface of a can trunk is likely to roughen, which is not preferable. The crystal grain size number of the ferrite grains in the base steel sheet 11 is preferably 10.2 or more. The upper limit of the crystal grain size number of the ferrite grains in the base steel sheet 11 is not particularly regulated, but there are many cases where it is difficult to set the crystal grain size number to more than 12.5.

The crystal grain size number of the ferrite grains in the present embodiment means a crystal grain size number of ferrite grains according to JIS G 0551 (2013). In JIS G 0551 (2013), the grain size number is defined as a value of G calculated by Expression (151) using the average number m of crystal grains per square millimeter of a test piece cross section, and the value of G can be a positive value, zero, or a negative value.

$$m = 8 \times 2^G \quad \text{(Expression 151)}$$

Therefore, the crystal grain size number of the ferrite grains becomes the value of G calculated by Expression (151) using the average number in of crystal grains of ferrite per square millimeter of a test piece cross section. As is clear from Expression (151), a large crystal grain size number means that the average number m of crystal grains per square millimeter of a test piece cross section is large and means that ferrite grains are refined.

The above-described crystal grain size number of the ferrite grains can be measured according to the method specified by JIS G 0551 (2013) and can be measured using, for example, a comparison method described in Section 7.2 of JIS G 0551 (2013). In more detail, the crystal grain size number of the ferrite grains can be measured by observing a portion in a range from a position at a depth of ¼ of a sheet thickness to a depth of ¾ of the sheet thickness in a thickness direction of an L-section in a cross section parallel to a rolling direction (L direction) of the base steel sheet 11 using the above-described comparison method.

Hitherto, the base steel sheet 11 in the Ni diffusion-plated steel sheet 1 according to the present embodiment has been described in detail.

(Regarding Fe—Ni Diffusion Alloy-Plating Layer 13)

Next, the Fe—Ni diffusion alloy-plating layer 13 according to the present embodiment will be described in detail.

The Fe—Ni diffusion alloy-plating layer 13 included in the Ni diffusion-plated steel sheet 1 according to the present embodiment is formed of a Fe—Ni diffusion phase throughout the overall thickness (in other words, Fe diffuses up to the surface layer of the Fe—Ni diffusion alloy-plating layer 13). The Fe—Ni diffusion alloy plating is less noble than pure Ni. Therefore, even when a crack (defect part) that may reach the base steel sheet 11 is present in the Fe—Ni diffusion alloy-plating layer 13 and a corrosion battery is formed between the Fe—Ni diffusion alloy-plating layer 13 and Fe in the base steel sheet 11, the electromotive force is small. From this fact, the Fe—Ni diffusion alloy-plating layer 13 has a characteristic of not easily corroding from a defect part.

<Regarding Coating Weight>

In the present embodiment, the Ni coating weight of the Fe—Ni diffusion alloy-plating layer 13 is in a range of 9.0 to 35 g/m². A Ni diffusion-plated steel sheet in which the Ni coating weight of a Fe—Ni diffusion alloy-plating layer 13 (the Ni coating weight of a Ni plating before an alloying treatment by thermal diffusion) is less than 9.0 g/m² (that is, a Ni diffusion-plated steel sheet in which the thickness of a Ni-plating layer after plating is approximately less than 1.0 μm) can be realized in many cases even in the related art and is regarded to be outside the scope of the present invention. Therefore, in the present embodiment, the Ni coating weight of the Fe—Ni diffusion alloy-plating layer 13 is set to 9.0 g/m² or more which means that the thickness of the plating layer after Ni plating is approximately 1.0 μm or more.

In a case where the Ni coating weight of the Fe—Ni diffusion alloy-plating layer 13 exceeds 35 g/m², it becomes difficult for sufficient Fe—Ni alloying up to the surface of the Fe—Ni diffusion alloy-plating layer 13 to progress without causing the coarsening of ferrite crystal grains even when an electroplating method as described below in detail is used. Therefore, the Ni coating weight of the Fe—Ni diffusion alloy-plating layer 13 according to the present embodiment is set to 35 g/m² or less. In the present embodiment, the Ni coating weight of the Fe—Ni alloy-plating layer 13 is preferably 15 to 30 g/m² and more preferably 15 to 20 g/m² or less.

The amount of total metallic Ni (the Ni coating weight) in the Fe—Ni diffusion alloy-plating layer 13 can be specified using a method in which the Fe—Ni diffusion alloy-plating layer 13 is dissolved in an acid (for example, concentrated hydrochloric acid) and analyzed by an inductively coupled plasma (ICP) emission spectroscopic analysis method.

<Regarding Fe Concentration Cs of Outermost Layer>

As described above, in the Fe—Ni diffusion alloy-plating layer 13, Fe diffuses up to the outermost layer of the plating layer, and the Fe concentration of the outermost layer can be specified. In the Fe—Ni diffusion alloy-plating layer 13 according to the present embodiment, the Fe concentration Cs of the outermost layer is in a range of 10 to 55 mass %. In a case where the Fe concentration Cs of the outermost layer is less than 10 mass %, the sliding ability of the Fe—Ni diffusion alloy-plating layer 13 is insufficient, and the adhesion or the like to a die during pressing is likely to occur, which is not preferable. The Fe concentration Cs of the outermost layer is preferably 15 mass % or more and more preferably 20 mass % or more.

In a case where the Fe concentration Cs of the outermost layer exceeds 55 mass %, rust is likely to be generated from the Fe—Ni diffusion alloy-plating layer 13, which is not preferable. Therefore, the Fe concentration Cs of the outermost layer is 55 mass % or less and preferably 45 mass % or less. Depending on an environment in which the Ni diffusion-plated steel sheet 1 according to the present embodiment is placed, there is a possibility that an oxide film is likely to grow in a surface layer of the Fe—Ni diffusion alloy-plating layer 13 and the conductive property may degrade. When the Fe concentration Cs of the outermost layer is set to 45 mass % or less and preferably set to 43 mass % or less, it becomes possible to suppress the above-described growth of an oxide film and preemptively suppress the degradation of the conductive property.

The Fe concentration Cs of the outermost layer of the Fe—Ni diffusion alloy-plating layer 13 can be measured by Auger electron spectroscopy (AES). First, for a sample of interest, in order to remove a contaminated layer (for example, an oxide layer or the like) which may be formed on the surface of the Fe—Ni diffusion alloy-plating layer 13, the contaminated layer or the oxide layer as much as, for example, 4 nm in thickness from the surface layer of the Fe—Ni diffusion alloy-plating layer 13 in terms of SiO₂ is removed by argon ion etching in an AES device. After that, in consideration of unevenness in measurement values attributed to measurement positions, Fe concentrations are measured using the AES device at nine random positions, and the average value of the measurement values at five positions remaining after excluding two positions with first and second highest measurement values and two positions with first and second lowest measurement values is computed. The average value obtained at this time can be regarded as the Fe concentration Cs of the outermost layer of the Fe—Ni alloy-plating layer 13.

A change in the Fe concentration in a cross section of the Fe—Ni diffusion alloy-plating layer 13 (concentration profile of Fe) can also be measured using AES. First, for a sample of interest, a polishing treatment is carried out on an L-section (a cross section parallel to a rolling direction and a sheet thickness direction), and then a portion as much as 50 nm in thickness from the surface layer of the sample in terms of $SiO_2$ is argon-ion-etched in the AES device, thereby removing a worked layer generated by the polishing treatment. After that, a linear analysis in the thickness direction using the AES device is carried out.

Hitherto, the Fe—Ni diffusion alloy-plating layer 13 according to the present embodiment has been described in detail.

(Regarding Method for Manufacturing Ni Diffusion-Plated Steel Sheet)

Figure 3:
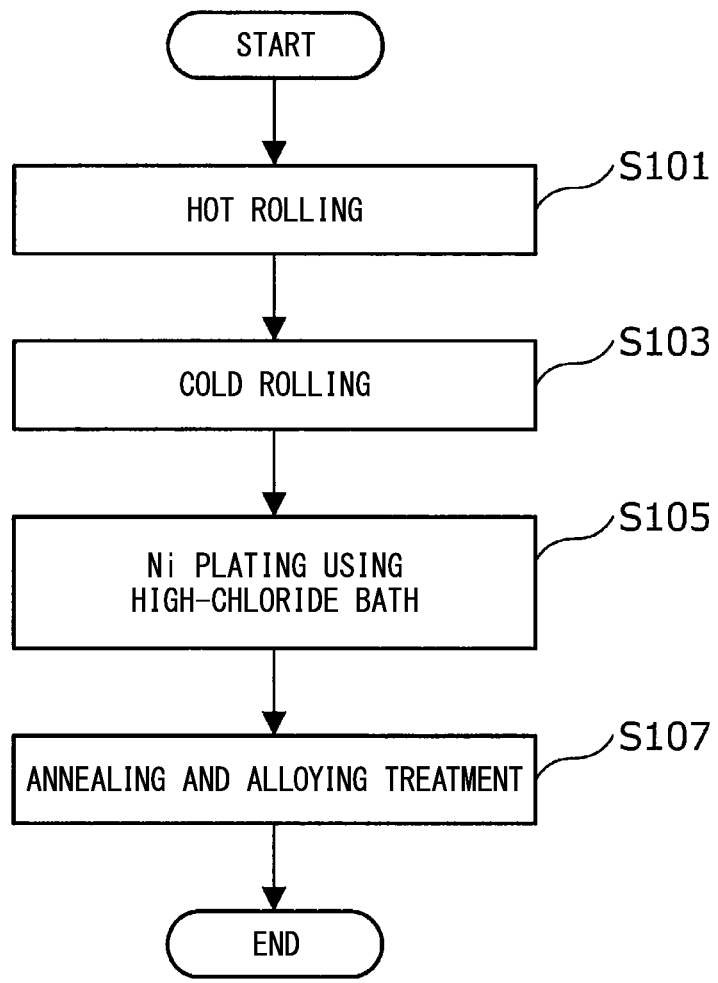
FIG. 3 is a flowchart showing an example of a flow of a method for manufacturing a Ni diffusion-plated steel sheet according to an embodiment of the present invention.

Subsequently, a method for manufacturing a Ni diffusion-plated steel sheet according to the present embodiment will be described in detail with reference to FIG. 3. FIG. 3 is a flowchart showing an example of a flow of the method for manufacturing a Ni diffusion-plated steel sheet according to the present embodiment.

In the manufacturing of the Ni diffusion-plated steel sheet (particularly, a steel strip) according to the present embodiment, it is preferable that, prior to a continuous annealing process of a cold-rolled steel sheet, a pre-cleaning treatment be carried out on an IF steel-based cold-rolled steel sheet, Ni plating be carried out by, for example, Ni electroplating, and then continuous annealing be carried out. This is because, in such a case, the recrystallization of the base steel sheet and the Fe—Ni alloying can be carried out at the same time in the process of continuous annealing, which is rational. On the basis of such an idea, a preferred method for manufacturing a Ni diffusion-plated steel sheet described below in detail has processes as shown in FIG. 3.

That is, as shown in FIG. 3, the method for manufacturing a Ni diffusion-plated steel sheet according to the present embodiment includes a hot rolling step (step S101) of hot-rolling a cast piece having chemical compositions as described above to produce a hot-rolled steel sheet, a cold rolling process (step S103) of cold-rolling the obtained hot-rolled steel sheet to produce a cold-rolled steel sheet, a Ni plating process (step S105) of carrying out Ni plating on the obtained cold-rolled steel sheet using a high-chloride bath, and an annealing and alloying treatment process (step S107) of carrying out a heat treatment on the obtained Ni-plated steel sheet, thereby carrying out an annealing and alloying treatment.

Here, steelmaking conditions for obtaining the cast piece that is subject to the hot rolling process are not particularly limited as long as a cast piece can be obtained by melting steel having chemical compositions as described above, and a well-known method may be appropriately used. On the cast piece (IF steel-based cast piece) obtained by the above-described method, hot rolling as described below in detail is carried out.

<Hot Rolling Process>

The hot rolling process (step S101) is a process of hot-rolling a cast piece (IF steel-based cast piece) having predetermined chemical compositions to produce a hot-rolled steel sheet. Such a hot rolling process is a critical process for putting the crystal grains of the base steel sheet 11 in the Ni diffusion-plated steel sheet into a desired state.

In such a hot rolling process, it is preferable that, for example, finish rolling be carried out at a temperature in a range of the Ar3 point to 950° C. by heating the cast piece up to 1,000° C. or higher (preferably in a range of 1,050° C. to 1,300° C.), and coiling be carried out by carrying out cooling after the finish rolling, thereby producing a hot-rolled steel strip.

In a case where the heating temperature is lower than 1,000° C., there is a case where it becomes difficult to ensure the lower limit value (that is, the Ar3 point) of the temperature (finish rolling temperature) in the finish rolling, and, in a case where the heating temperature exceeds 1,300° C., there is a case where an oxide to be formed on a cast piece surface increases, which causes the generation of a surface defect.

In a case where the finish rolling temperature is lower than the Ar3 point, the rolling is carried out in an α region, and thus there is a case where the texture significantly changes and earring resistance of the Ni diffusion-plated steel sheet degrades. On the other hand, in a case where the finish rolling temperature exceeds 950° C., there is a case where crystal grains in the hot-rolled steel sheet coarsen and it becomes impossible to obtain favorable earring resistance and fine ferrite grain sizes as the cold-rolled steel sheet.

Here, it is preferable to rapidly (for example, within three seconds) cool the steel sheet after the end of the finish rolling in the above-described temperature range from the viewpoint of suppressing the grain growth of austenite grains.

A coiling temperature of the obtained hot-rolled steel sheet is preferably set in a range of 500° C. to 640° C. However, in a case where C content in the hot-rolled steel sheet is large (for example, a case where C content is 0.0075 mass % or more), the coiling temperature is preferably set to 600° C. or higher. In a case where the coiling temperature exceeds 640° C., there is a possibility that the crystal grains may become coarse after cold rolling and annealing described below. On the other hand, in a case where the coiling temperature becomes lower than 500° C., the quality becomes uneven in a coil width direction and a longitudinal direction, and there is a high possibility that the in-plane anisotropy Δr, which is a scale of anisotropy of the r value, may increase.

Here, the in-plane anisotropy Δr is defined by Expression (301).

$$\Delta r=(r_0+r_{90}-2\times r_{45})/2 \qquad \text{Expression (301)}$$

Here, in Expression (301), $r_0$: Rolling-direction r value $r_{90}$: r value in a direction orthogonal to the rolling direction $r_{45}$: 45°-direction r value r value: Plastic strain ratio (Lankford value).

From the steel sheet hot-rolled as described above, a scale on the surface layer is removed by, generally, pickling.

<Cold Rolling Process>

The cold rolling process (step S103) is a process of cold-rolling the hot-rolled steel sheet obtained by the hot rolling process to produce a cold-rolled steel sheet.

In such a cold rolling process, the cold rolling reduction is preferably, for example, in a range of 84% to 91%. In a case where the cold rolling reduction becomes less than 84%, there is a concern that ferrite crystal grains may coarsen, which is not preferable. On the other hand, in a case where the cold rolling reduction exceeds 91%, there is a concern that the in-plane anisotropy of the r value may increase, which is not preferable from the viewpoint of ensuring earring resistance.

However, from the viewpoint of ensuring earring resistance, it is also possible to prepare a steel sheet having a cold rolling ratio changed in advance using a hot-rolled steel sheet material, obtain a relationship between the cold rolling reduction and Ar specified by Expression (301), and set the cold rolling reduction such that Ar of the steel sheet decreases. Even in such a case, the cold rolling reduction obtained from the relationship between the cold rolling reduction and Ar approximately matches the above-described range of the cold rolling reduction.

In the cold rolling process, in a case where a finish sheet thickness exceeds 1.20 mm, there is a possibility that the sheet thickness of the hot-rolled steel sheet to be used may become too thick and the cold rolling load may become excessive. Therefore, the finish sheet thickness in the cold rolling process is preferably set to 1.20 mm or less and more preferably set to 0.80 mm or less. On the other hand, when the finish sheet thickness becomes too thin, there is also a case where it becomes difficult to ensure stiffness as a battery can after forming, and thus the finish sheet thickness is preferably 0.08 mm or more, more preferably 0.15 mm or more, and still more preferably 0.22 mm or more.

In the method for manufacturing a Ni diffusion-plated steel sheet according to the present embodiment, as described above, it is preferable that, after the end of the cold rolling process of the base steel sheet and before the annealing process, Ni plating described below be carried out on the steel sheet. With such a flow, it is possible to carry out the softening annealing of the base steel sheet and the Fe—Ni alloying in the Ni-plating layer at the same time in the annealing process subsequent to the Ni plating process, which is not only rational but also advantageous from the viewpoint of energy saving.

<Ni Plating Process>

The Ni plating process (step S105) is a process of carrying out Ni plating on the obtained cold-rolled steel sheet using a high-chloride bath. With the Ni plating process, a Ni-plating layer is formed on at least one surface of the base steel sheet.

In the method for manufacturing a Ni diffusion-plated steel sheet according to the present embodiment, an electroplating method in which a specific chloride bath (that is, a high-chloride bath) is used in carrying out Ni plating on the cold-rolled steel sheet is employed. Therefore, in the annealing and alloying process in the rear stage, it becomes possible to accelerate the Ni plating to turn into a Fe—Ni alloy, and it is possible to set the Fe concentration Cs of the outermost layer of the Fe—Ni diffusion alloy-plating layer 13 to 10 mass % or more while maintaining a state in which the crystal grains in the base steel sheet are refined even when the Ni coating weight is 9.0 g/m$^2$ or more. That is, even when the Ni coating weight is 9.0 g/m$^2$ or more, it is possible to diffuse Fe up to the outermost layer of the Fe—Ni diffusion alloy-plating layer 13 while maintaining a state in which the crystal grains in the base steel sheet are refined.

(Regarding Composition of Plating Bath)

Here, the plating bath used for Ni electroplating is a high-chloride bath in which an electrolytic solution having a chloride ion concentration of 35.0 g/L or more and a Ni ion concentration of 40.0 g/L or more is used. When Ni plating is carried out using such a high-chloride bath, the Fe—Ni alloying of in the annealing and alloying process is significantly accelerated. The reason therefor is not clear, but it is assumed that, probably, an internal stress generated in an electrodeposited film affects the alloying.

(Chloride Ion Concentration: 35.0 g/L or More)

Regarding the specific composition of the high-chloride bath used in the electroplating, the chloride ion concentration in the Ni plating bath is set to 35.0 g/L or more. In a Watts bath that is generally used for Ni plating, the chloride ion concentration is approximately 8.9 to 17.9 g/L (30 to 60 g/L in terms of nickel chloride-hexahydrate). Compared with Ni electrodeposited from the Watts bath, in Ni electrodeposited from the Ni plating bath having a chloride ion concentration of 35.0 g/L or more, the internal stress is large, and the diffusion of Fe in the plating layer during annealing and alloying is fast. When the chloride ion concentration in the Ni plating bath is too low, there is a case where current efficiency decreases and sufficient productivity cannot be obtained or the internal stress becomes relatively small, and thus the chloride ion concentration of the Ni plating bath is preferably 40.0 g/L or more, more preferably 50.0 g/L or more, and still more preferably 60.0 g/L or more.

The upper limit of the chloride ion concentration is not particularly limited; however, from the viewpoint of the solubility of nickel chloride, the chloride ion concentration is preferably set to 150.0 g/L or less. The chloride ion concentration in the Ni plating bath is preferably 125.0 g/L or less, more preferably 110.0 g/L or less, and still more preferably 100.0 g/L or less.

(Ni Ion Concentration: 40.0 g/L or More)

When the Ni ion concentration in the Ni plating bath is too low, there is a case where current efficiency decreases and sufficient productivity cannot be obtained or the internal stress becomes relatively small, and thus the Ni ion concentration in the Ni plating bath is set to 40.0 g/L or more, preferably set to 60.0 g/L or more, and more preferably set to 80.0 g/L or more.

The upper limit of the Ni ion concentration is not particularly limited; however, from the viewpoint of the solubility of nickel chloride, the Ni ion concentration is preferably set to 125.0 g/L or less and more preferably set to 100.0 g/L or less.

Here, a sulfate ion concentration in the Ni plating bath is not particularly limited, and the Ni plating bath may be a pure chloride bath not including any sulfate ion or a bath in which the sulfate ion concentration is higher than the chloride ion concentration as in the Watts bath. A borate concentration in the Ni plating bath is not particularly limited, and, similar to the Watts bath, boric acid may be contained in a range of 15 to 60 g/L. When the Ni plating bath contains 15 to 60 g/L of boric acid, it becomes possible to stabilize the pH of the plating bath, which is preferable.

The Ni plating bath may include, in addition to a Ni ion, for example, as a cation of a supporting electrolyte or the like, a cation such as a Na ion that is not precipitated from an aqueous solution.

The pH of the Ni plating bath is not particularly limited as long as the pH is in a weakly acidic region. When the pH of the Ni plating bath is too low, the steel sheet is likely to dissolve, and, when the pH is too high, a plating burn is likely to be generated, and thus the pH of the Ni plating bath is preferably 2.5 or more and 5.0 or less.

Regarding a gloss additive that is often added to the Watts bath, a primary gloss additive represented by saccharine sodium has an action of relaxing the internal stress of the Ni plating and is thus preferably not positively added. In addition, a secondary gloss additive represented by 1,4-butynediol has an effect of increasing the internal stress of the Ni plate, but there is a case where the diffusion of the secondary gloss additive is impaired by codeposited C, and thus the secondary gloss additive is preferably not positively added.

The temperature of the Ni plating bath (bath temperature) is not particularly limited, and the effect of the above-described plating bath can be obtained by setting the bath temperature in a well-known temperature range. However, in a case where the bath temperature is too low, there is a possibility that the current efficiency may decrease or the stress may become relatively low, and, in a case where the bath temperature is too high, there is a possibility that a Ti basket into which a Ni chip of a positive electrode is plugged or a Ti sheet of a substrate of an insoluble positive electrode (for example, an electrode in which a Ti substrate is coated with $IrO_2$ or the like) may easily dissolve. Therefore, in order to more reliably carry out an operation, the bath temperature of the Ni plating bath is preferably set to 40° C. or higher and 60° C. or lower.

A current density at the time of carrying out the Ni electroplating is not particularly limited, and the above-described effect of the plating bath can be obtained by setting the current density in a well-known current density range. However, in a case where the current density is too low, there is a possibility that the productivity may decrease, and, in a case where the current density is too high, there is a possibility that the current efficiency may decrease or a plating burn may be generated. Therefore, in order to more reliably carry out an operation, the current density at the time of carrying out the Ni electroplating is preferably 5 $A/dm^2$ or more and 50 $A/dm^2$ or less.

In the case of using a liquid cushion cell horizontal (LCC-H)-type plating cell [liquid cushion cell-horizontal, refer to, for example, Materia Japan by the Japan Institute of Metals, Vol. 23, Issue 6, pp. 541 to 543 (1984)], which is capable of smoothly supplying an ion by a high-speed flow, the Ni electroplating may be carried out at a higher current density.

Even when a cold-rolled steel sheet that has been annealed after cold rolling is used as a plating precursor for the above-described Ni electroplating, the effect of the above-described plating bath can be obtained. However, in order to further accelerate the diffusion of Fe, as described above, a cold-rolled steel sheet that is not annealed after cold rolling is preferably used. This is because, in the cold-rolled steel sheet that is not annealed after cold rolling, the strain energy in the steel sheet is large and thus Fe more easily diffuses in the cold-rolled steel sheet that is not annealed after cold rolling.

<Annealing and Alloying Treatment Process>

The annealing and alloying treatment process (step S107) is a process which is carried out after the Ni plating process and in which an annealing and alloying treatment is carried out by carrying out a heat treatment on the obtained Ni-plated steel sheet. With such an annealing and alloying treatment process, the base steel sheet is recrystallized, and Fe in the base steel sheet and Ni in the Ni-plating layer are mutually diffused, thereby changing the Ni-plating layer into a Fe—Ni diffusion alloy-plating layer. The annealing and alloying treatment process according to the present embodiment is a heat treatment process carried out according to a predetermined heat treatment condition, and is an annealing process from the viewpoint of the base steel sheet and an alloying treatment process from the viewpoint of the plating layer.

Here, the heat treatment for annealing and alloying is preferably carried out by continuous annealing rather than box annealing. In the case of box annealing, there is a possibility that crystal grain sizes or characteristics may become non-uniform due to the unevenness of the temperature distribution in a coil. In addition, in the box annealing, a steel sheet wound in a coil shape is heat-treated, and thus there is a possibility that, in the case of single-surface plating, the plated surface and the steel sheet surface may adhere to each other and, in the case of both-surface plating, the plated surfaces may adhere to each other, which generates a defect on the surface.

In the heat treatment by continuous annealing (annealing and alloying treatment), the soaking temperature is set to 740° C. to 850° C.

In a case where the soaking temperature is lower than 740° C., there is a concern that it may become difficult to set the Fe concentration Cs in the surface layer of the plating layer to 10 mass % or more even when the soaking period is set to 180 seconds, and, in this case, there is a concern that the recrystallization of the base steel sheet may become insufficient and the mean plastic strain ratio $r_1$ may decrease. Therefore, the soaking temperature is set to 740° C. or higher and preferably set to 750° C. or higher.

In a case where the soaking temperature exceeds 850° C., there is a concern that crystal grains may coarsen and it may become difficult to ensure a target crystal grain size number even when the soaking period is set to 10 seconds. Therefore, the soaking temperature is set to 850° C. or lower and preferably set to 820° C. or lower.

A soaking period is set in a range of 5 to 180 seconds. The soaking period is preferably 15 seconds or longer and more preferably 20 seconds or longer.

The soaking period is preferably 120 seconds or shorter and more preferably 50 seconds or shorter.

When the heat treatment is carried out at the above-described soaking temperature for the above-described soaking period, it becomes possible to realize a desired ferrite grain size number by recrystallizing the base steel sheet, and it becomes possible to produce a Fe—Ni diffusion alloy-plating layer in which the Fe concentration Cs of the outermost layer of the plating layer is 10% or more by diffusing Fe in the steel sheet up to the outermost layer of the plating layer.

Among the component ranges of steel according to the present embodiment, except for the component ranges of C: 0.0060% to 0.0110%, 500×[C]≤[Nb]/[C]≤8.0, and N: less than 0.0025%, the soaking temperature is desirably set to 820° C. or lower. In a case where the soaking temperature exceeds 820° C., there is a concern that crystal grains in the base steel sheet may coarsen.

Hitherto, an example of the method for manufacturing a Ni diffusion-plated steel sheet according to the present embodiment has been described in detail.

In the method for manufacturing a Ni diffusion-plated steel sheet according to the present embodiment, an over-aging treatment may not be carried out because, basically, the components are designed such that an excess solute C rarely remains in the steel sheet due to Ti or Nb. However, it is also acceptable to carry out an over-aging treatment, for example, in a temperature range of 350° C. to 500° C.

In addition, on the steel sheet on which the annealing and alloying treatment process (furthermore, the over-aging treatment carried out as necessary) has been carried out, temper rolling (skin pass rolling) may be carried out. The rolling reduction of the temper rolling is preferably set to, for example, 0.5% to 5.0%. In a case where the rolling reduction is less than 0.5%, there is a possibility that yield point elongation may occur due to aging at normal temperature. In a case where the rolling reduction exceeds 5.0%, there is a possibility that the total elongation (EL) may decrease and the press formability (drawability) may degrade. When temper rolling having a rolling reduction in a range of 0.5% to 5.0% is carried out, it is possible to almost completely suppress the generation of stretcher strain, and excellent press formability can be ensured, which is preferable.

With the manufacturing processes described above, the Ni diffusion-plated steel sheet according to the present embodiment is manufactured. Here, the sheet thickness (final sheet thickness) of the Ni diffusion-plated steel sheet according to the present embodiment is preferably in a range of 0.08 to 1.20 mm. The sheet thickness of the Ni diffusion-plated steel sheet according to the present embodiment is more preferably 0.15 mm or more and still more preferably 0.22 mm or more. The sheet thickness of the Ni diffusion-plated steel sheet according to the present embodiment is more preferably 0.80 mm or less. In a case where the final sheet thickness exceeds 1.20 mm, there is a possibility that it may become difficult to ensure rolling reduction at the time of cold rolling, and there is a case where it becomes difficult to obtain excellent drawability. In a case where the final sheet thickness is less than 0.08 mm, the sheet thickness of the hot-rolled steel sheet needs to be thin, and, in this case, there is a case where a finish temperature during the above-described hot rolling cannot be ensured.

EXAMPLES

Next, the Ni diffusion-plated steel sheet according to the present invention will be specifically described by way of examples and comparative examples. The examples described below are simply examples of the Ni diffusion-plated steel sheet according to the present invention, and the Ni diffusion-plated steel sheet according to the present invention is not limited to the examples described below.

Experiment Examples

In all of the examples and the comparative examples described below, on non-annealed IF steel (300 mm in length and 20 mm in width) cold-rolled to 0.25 mm, Ni plating was carried out by electroplating and then a heat treatment simulating a continuous annealing line was carried out. Here, as parts of test materials, cold-rolled steel sheets that had been annealed in advance were used.

Chemical compositions of the IF steel used in the present experiment examples are summarized in Table 1. Here, in Table 1, blank cells for chemical compositions indicate that the corresponding elements are intentionally not contained. In addition, in Table 1, the expression "tr." means that the content of a corresponding element is less than 0.008 mass %.

Temperature conditions (SRT: heating temperature, FT: final temperature, CT: coiling temperature, unit: ° C.) in a hot rolling process of the respective steel sheets and rolling reductions (Red, unit: %) in a cold rolling process are shown together in Table 1.

TABLE 1

| Kind of steel | Chemical composition (mass %, remainder is Fe and impurities) | | | | | | | | | |
|---|---|---|---|---|---|---|---|---|---|---|
| | C | Si | Mn | P | S | sol. Al | N | B | Ti | Nb |
| A | 0.0092 | 0.01 | 0.12 | 0.007 | 0.011 | 0.048 | 0.0022 | | | 0.046 |
| B | 0.0187 | 0.01 | 0.18 | 0.008 | 0.009 | 0.045 | 0.0016 | | 0.030 | 0.014 |
| C | 0.0052 | 0.01 | 0.16 | 0.011 | 0.010 | 0.028 | 0.0019 | | | 0.022 |
| D | 0.0048 | 0.01 | 0.14 | 0.010 | 0.008 | 0.022 | 0.0032 | | 0.008 | 0.020 |
| E | 0.0018 | tr. | 0.22 | 0.008 | 0.011 | 0.037 | 0.0012 | 0.0007 | 0.018 | 0.026 |
| F | 0.0080 | 0.02 | 0.16 | 0.008 | 0.009 | 0.042 | 0.0045 | 0.0002 | | 0.069 |
| G | 0.0008 | 0.01 | 0.18 | 0.010 | 0.012 | 0.052 | 0.0017 | 0.0002 | 0.031 | 0.014 |
| H | 0.0110 | 0.01 | 0.11 | 0.011 | 0.012 | 0.039 | 0.0022 | | | |
| I | 0.0450 | 0.02 | 0.23 | 0.012 | 0.009 | 0.053 | 0.0025 | | | |

| Kind of steel | Chemical composition (mass %, remainder is Fe and impurities) Expression (101) Right elements - left elements | Hot rolling conditions | | | Cold rolling conditions | Note |
|---|---|---|---|---|---|---|
| | | SRT (° C.) | FT (° C.) | CT (° C.) | Red (%) | |
| A | 0.00057 | 1220 | 900 | 630 | 87 | |
| B | 0.00010 | 1250 | 900 | 630 | 80 | |
| C | 0.00067 | 1220 | 900 | 630 | 86 | |
| D | 0.00075 | 1220 | 900 | 630 | 86 | |
| E | 0.00142 | 1250 | 890 | 620 | 85 | |
| F | 0.00075 | 1200 | 925 | 630 | 87 | |
| G | 0.00161 | 1230 | 900 | 620 | 85 | Comparative Example |
| H | −0.00007 | 1220 | 900 | 630 | 88 | Comparative Example |
| I | −0.00293 | 1220 | 900 | 600 | 89 | Comparative Example |

After the cold rolling, the steel sheets were cleaned by alkaline degreasing and pickling according to a well-known method. After that, Ni plating was carried out by electroplating. Ni plating baths used are summarized in Table 2. For the respective plating baths shown in Table 2, the pHs of the plating baths were adjusted using basic nickel carbonate [$Ni_4CO_3(OH)_6(H_2O)_4$], and the plating bath temperatures were commonly set to 60° C. In addition, as positive electrodes, Ni plates having a purity of 99.9% or more were respectively used, and negative electrode current densities were commonly set to 20 A/dm². In Table 2, the expression "High-Cl bath" means "high-chloride bath". In addition, the Ni coating weights were measured using a scanning-type X-ray fluorescence spectrometer ZSX Primus II manufactured by Rigaku Corporation after the Ni plating.

[Measurement of Fe Concentration Cs of Outermost Layer]

The Fe concentration Cs of the outermost layer of each of the Ni diffusion-plating layers was analyzed by AES according to the above-described method, and the Fe concentration in the case of regarding the sum of Ni and Fe as 100% was computed by mass %. The obtained results are shown together in Table 3. In the analysis, an AES device used was a scanning-type Auger electron spectroscope PHI-610 manufactured by PerkinElmer Co., Ltd. In the analysis, a contaminated layer (for example, an oxide layer or the like) which might be possibly formed on a surface layer of the Fe—Ni diffusion alloy-plating layer was removed by sputtering a surface of the obtained sample with Ar ions as much as 10 nm in terms of $SiO_2$, and then a composition in a region having a diameter of 800 μm was analyzed.

TABLE 2

| Plating bath | Component concentration (g/L) | | | | | pH | Note |
|---|---|---|---|---|---|---|---|
| | $NiSO_4$ | $NiCl_2·6H_2O$ | $H_3BO_3$ | Chloride ion concentration | Nickel ion concentration | | |
| Watts bath | 300 | 40 | 40.0 | 11.9 | 76.9 | 4.0 | Comparative Example |
| High-Cl bath 1 | 200 | 150 | 40.0 | 44.7 | 81.7 | 4.0 | |
| High-Cl bath 2 | 0 | 150 | 40.0 | 44.7 | 37.0 | 4.0 | |
| High-Cl bath 3 | 0 | 250 | 40.0 | 74.6 | 61.7 | 4.0 | |
| High-Cl bath 4 | 0 | 350 | 40.0 | 104.4 | 86.4 | 4.0 | |

On the steel sheets on which the Ni plating had been carried out, a heat treatment simulating a continuous annealing line (that is, an annealing and alloying treatment) was carried out in an atmosphere including 4% by volume of $H_2$ and a remainder of $N_2$. On the plated steel sheets that had been subjected to such a heat treatment process, temper rolling having a rolling reduction of 1.8% was carried out.

The types of Ni plating baths used at the time of Ni plating in the respective test examples, the Ni coating weights of Ni platings, and annealing conditions (soaking temperature and soaking period) after plating are shown together in Table 3.

In Table 3, in samples No. 16 to No. 18, annealing was carried out on the cold-rolled steel sheets at 780° C. for 45 seconds before the Ni plating.

On the respective Ni diffusion-plated steel sheets obtained by the above-described methods, the following evaluations were carried out.

[Microstructure Observation and Crystal Grain Size Number Measurement]

Optical microscopic observation was carried out on L-sections (cross sections parallel to a rolling direction and a sheet thickness direction) of the respective Ni diffusion-plated steel sheets, and the microstructures of the cold-rolled steel sheets were specified. As a result, the microstructures of the respective Ni diffusion-plated steel sheets were all a ferrite single-phase microstructure. Furthermore, the crystal grain size number of ferrite grains in the Ni diffusion-plated steel sheet of each test number was obtained by observing a portion in a range from a position at a depth of ¼ of a sheet thickness to a depth of ¾ of the sheet thickness in a thickness direction of the L-section and using the above-described method on the basis of JIS G 0552 (2013). The obtained results are shown together in Table 4.

[Continuous Press Property]

Regarding each of the Ni diffusion-plated steel sheets, a continuous press property in cylindrical drawing was evaluated by multi-stage press forming including four stages of working. Specifically, No. 641R manufactured by Nihon Kohsakuyu Co., Ltd. was used as a pressing oil, and a sample was punched at a blank diameter of 52 mmφ and drawn to a height of 36 mm and a diameter of 16 mm by the four stages. This pressing was carried out 100 times in the same die, then, the surfaces of the obtained 100 drawn products were visually observed, all of drawn products from which no defect was recognized were evaluated as Very Good, drawn products from which a slight defect was observed were evaluated as Good, and drawn products from which a defect was detected were evaluated as Bad. During 100 times of the continuous pressing, even when a plated metal adhered to the pressing die, the pressing was continued without removing the adhering metal. The obtained results are shown together in Table 4.

[Corrosion Resistance]

The 100th drawn can product obtained from the above-described continuous pressing test was degreased with an organic solvent and then subjected to a one-hour-long method of salt spray testing (JIS Z 2371), and a red rust generation status was checked. Drawn can products in which red rust was not generated were evaluated as Good, and drawn can products in which red rust was generated were evaluated as Bad. The obtained results are shown together in Table 4.

[Contact Resistance]

The respective Ni diffusion-plated steel sheets were held in an environment of 85° C. and a relative humidity of 85% for two weeks, and then the contact resistances of steel sheet samples under a load of 20 g were measured using an electric contact point simulator CRS-1 manufactured by Yamasaki Seiki Co., Ltd. Ni diffusion-plated steel sheets in which a measurement value of the contact resistance was less than 30 mΩ were evaluated as Very Good, Ni diffusion-plated steel sheets in which a measurement value was 30 mΩ or more and less than 50 mΩ were evaluated as Good, and Ni diffusion-plated steel sheets in which a measurement value was 50 mΩ or more were evaluated as Bad. The obtained results are shown together in Table 4.

TABLE 3

| Test No. | Base steel sheet | Annealing before plating (780° C. × 45 sec) | Ni plating | | | Annealing and alloying treatment | |
|---|---|---|---|---|---|---|---|
| | | | Plating bath type | Coating weight (g/m$^2$) | Plating thickness (μm) | Soaking temperature (° C.) | Soaking period (sec) |
| 1 | A | Absent | High-Cl bath 4 | 30 | 3.37 | 790 | 60 |
| 2 | A | Absent | High-Cl bath 4 | 25 | 2.81 | 790 | 60 |
| 3 | A | Absent | High-Cl bath 4 | 20 | 2.24 | 790 | 60 |
| 4 | A | Absent | High-Cl bath 4 | 15 | 1.68 | 790 | 60 |
| 5 | A | Absent | High-Cl bath 4 | 10 | 1.12 | 790 | 60 |
| 6 | B | Absent | High-Cl bath 4 | 20 | 2.24 | 800 | 45 |
| 7 | C | Absent | High-Cl bath 4 | 20 | 2.24 | 790 | 40 |
| 8 | D | Absent | High-Cl bath 4 | 20 | 2.24 | 790 | 40 |
| 9 | E | Absent | High-Cl bath 4 | 20 | 2.24 | 780 | 45 |
| 10 | F | Absent | High-Cl bath 4 | 20 | 2.24 | 781 | 40 |
| 11 | A | Absent | High-Cl bath 1 | 20 | 2.24 | 790 | 60 |
| 12 | A | Absent | High-Cl bath 2 | 20 | 2.24 | 790 | 60 |
| 13 | A | Absent | High-Cl bath 3 | 20 | 2.24 | 790 | 60 |
| 14 | G | Absent | High-Cl bath 4 | 20 | 2.24 | 780 | 45 |
| 15 | H | Absent | High-Cl bath 4 | 20 | 2.24 | 790 | 60 |
| 16 | I | Present | Watts bath | 20 | 2.24 | 860 | 60 |
| 17 | I | Present | Watts bath | 15 | 1.68 | 800 | 60 |
| 18 | I | Present | Watts bath | 15 | 1.68 | 720 | 60 |
| 19 | A | Absent | High-Cl bath 4 | 38 | 4.26 | 810 | 40 |
| 20 | A | Absent | High-Cl bath 4 | 8.0 | 0.90 | 790 | 60 |
| 21 | A | Absent | Watts bath | 10 | 1.12 | 790 | 60 |
| 22 | A | Absent | Watts bath | 8.0 | 0.90 | 790 | 60 |

TABLE 4

| Test No. | Ferrite grain size number | Outermost layer Fe concentration Cs (mass %) | Evaluation results | | | Note |
|---|---|---|---|---|---|---|
| | | | Continuous pressing | Corrosion resistance | Contact angle | |
| 1 | 10.3 | 13 | Good | Good | Very Good | Example |
| 2 | 10.3 | 32 | Good | Good | Very Good | Example |
| 3 | 10.3 | 44 | Very Good | Good | Very Good | Example |

TABLE 4-continued

| Test No. | Ferrite grain size number | Outermost layer Fe concentration Cs (mass %) | Continuous pressing | Corrosion resistance | Contact angle | Note |
|---|---|---|---|---|---|---|
| 4 | 10.3 | 49 | Very Good | Good | Very Good | Example |
| 5 | 10.3 | 54 | Very Good | Good | Good | Example |
| 6 | 10.7 | 47 | Very Good | Good | Very Good | Example |
| 7 | 11.8 | 42 | Very Good | Good | Very Good | Example |
| 8 | 11.9 | 41 | Very Good | Good | Very Good | Example |
| 9 | 10.3 | 41 | Very Good | Good | Very Good | Example |
| 10 | 10.8 | 40 | Very Good | Good | Very Good | Example |
| 11 | 10.3 | 41 | Very Good | Good | Very Good | Example |
| 12 | 10.3 | 40 | Very Good | Good | Very Good | Example |
| 13 | 10.3 | 43 | Very Good | Good | Very Good | Example |
| 14 | 9.1 | 41 | Very Good | Bad | Very Good | Comparative Example |
| 15 | 8.0 | 45 | Very Good | Bad | Very Good | Comparative Example |
| 16 | 4.5 | 37 | Good | Bad | Very Good | Comparative Example |
| 17 | 9.1 | 8 | Bad | Bad | Very Good | Comparative Example |
| 18 | 10.2 | 2 | Bad | Good | Very Good | Comparative Example |
| 19 | 10.4 | 6 | Bad | Bad | Very Good | Comparative Example |
| 20 | 10.3 | 57 | Very Good | Bad | Good | Comparative Example |
| 21 | 10.3 | 1 | Bad | Good | Very Good | Comparative Example |
| 22 | 10.3 | 25 | Good | Bad | Very Good | Comparative Example |

As is clear from Table 3 and Table 4, the Ni diffusion-plated steel sheets corresponding to the examples of the present invention showed excellent evaluation results in all of the continuous press property, the corrosion resistance, and the contact resistance value. On the other hand, it was clarified that the Ni diffusion-plated steel sheets corresponding to the comparative examples of the present invention were poor in at least any of the continuous press property or the corrosion resistance.

Particularly, in test numbers 14 to 16, despite the fact that the Fe—Ni diffusion alloy-plating layers satisfied the configuration requirements according to the present embodiment, the corrosion resistance was found to be poor. This is considered to be because the base steel sheet did not satisfy the requirements of the present invention, and thus the crystal grains in the base steel sheet coarsened (that is, the ferrite grain size number became less than 10.0), and a grain boundary crack generated in the base steel sheet during forming propagated to the Fe—Ni diffusion alloy-plating layer.

Hitherto, the preferred embodiment of the present invention has been described in detail with reference to the accompanying drawings, but the present invention is not limited to such examples. It is evident that a person skilled in the art of the present invention is able to consider a variety of modification examples or correction examples within the scope of the technical concept described in the claims, and it is needless to say that such examples are understood to be in the technical scope of the present invention.

BRIEF DESCRIPTION OF THE REFERENCE SYMBOLS

1: Ni diffusion-plated steel sheet
11: Base steel sheet
13: Fe—Ni diffusion alloy-plating layer

The invention claimed is:
1. A Ni diffusion-plated steel sheet, comprising:
a base steel sheet; and
a Fe—Ni diffusion alloy-plating layer positioned on at least one surface of the base steel sheet,
wherein a Ni coating weight of the Fe—Ni diffusion alloy-plating layer is 9.0 to 35 g/m$^2$,
a Fe concentration "Cs" of an outermost layer of the Fe—Ni diffusion alloy-plating layer is 12 to 55 mass %,
a chemical composition of the base steel sheet includes, by mass %:
C: 0.0010% to 0.0200%;
Si: limited to 0.1% or less;
Mn: 0.05% to 0.90%;
P: limited to 0.025% or less;
S: limited to 0.025% or less;
sol. Al: 0.003% to 0.100%;
N: limited to 0.0070% or less;

B: 0% to 0.0050%, further contains
at least one of Ti: limited to 0.100% or less or Nb: limited to 0.120% or less such that a relationship represented by Expression (1) is satisfied,
a remainder consisting of Fe and impurities, and
a ferrite grain size number specified by JIS G 0551 (2013) of the base steel sheet is 10.0 or more, $$(C/12+N/14)<(Ti/48+Nb/93)+0.0010 \qquad \text{Expression (1)}$$

in Expression (1), C, N, Ti, and Nb are contents (unit: mass %) of each element, to which 0 is assigned in a case where each element is not included.

2. The Ni diffusion-plated steel sheet according to claim 1, wherein the Fe concentration "Cs" of the outermost layer of the Fe—Ni diffusion alloy-plating layer is 15 to 40 mass %.

3. The Ni diffusion-plated steel sheet according to claim 1, wherein the Ni coating weight of the Fe—Ni diffusion alloy-plating layer is 15 to 30 g/m².

4. The Ni diffusion-plated steel sheet according to claim 1, wherein the Ni diffusion-plated steel sheet is used as a material for a container, and, the Fe—Ni diffusion alloy-plating layer is provided on a side of the base steel sheet, which will become an outer surface of a container by press forming.

5. The Ni diffusion-plated steel sheet according to claim 2, wherein the Ni coating weight of the Fe—Ni diffusion alloy-plating layer is 15 to 30 g/m².

6. The Ni diffusion-plated steel sheet according to claim 2, wherein the Ni diffusion-plated steel sheet is used as a material for a container, and, the Fe—Ni diffusion alloy-plating layer is provided on a side of the base steel sheet, which will become an outer surface of a container by press forming.

7. The Ni diffusion-plated steel sheet according to claim 3, wherein the Ni diffusion-plated steel sheet is used as a material for a container, and, the Fe—Ni diffusion alloy-plating layer is provided on a side of the base steel sheet, which will become an outer surface of a container by press forming.

8. A Ni diffusion-plated steel sheet, comprising:
a base steel sheet; and
a Fe—Ni diffusion alloy-plating layer positioned on at least one surface of the base steel sheet,
wherein a Ni coating weight of the Fe—Ni diffusion alloy-plating layer is 9.0 to 35 g/m²,
a Fe concentration "Cs" of an outermost layer of the Fe—Ni diffusion alloy-plating layer is 12 to 55 mass %,
a chemical composition of the base steel sheet includes, by mass %:
C: 0.0010% to 0.0200%;
Si: limited to 0.1% or less;
Mn: 0.05% to 0.90%;
P: limited to 0.025% or less;
S: limited to 0.025% or less;
sol. Al: 0.003% to 0.100%;
N: limited to 0.0070% or less;
B: 0% to 0.0050%, further contains
at least one of Ti: limited to 0.100% or less or Nb: limited to 0.120% or less such that a relationship represented by Expression (1) is satisfied,
a remainder comprising Fe and impurities, and
a ferrite grain size number specified by JIS G 0551 (2013) of the base steel sheet is 10.0 or more, $$(C/12+N/14)<(Ti/48+Nb/93)+0.0010 \qquad \text{Expression (1)}$$

in Expression (1), C, N, Ti, and Nb are contents (unit: mass %) of each element, to which 0 is assigned in a case where each element is not included.

* * * * *